(12) United States Patent
Stewart

(10) Patent No.: US 10,554,885 B2
(45) Date of Patent: Feb. 4, 2020

(54) METHODS AND APPARATUS FOR IMPLEMENTATION OF AN ORIENTATION-BASED USER INTERFACE

(71) Applicant: GoPro, Inc., San Mateo, CA (US)

(72) Inventor: Gregory Stewart, San Mateo, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 15/945,596

(22) Filed: Apr. 4, 2018

(65) Prior Publication Data
US 2019/0313023 A1    Oct. 10, 2019

(51) Int. Cl.
H04N 5/232    (2006.01)
H04W 4/23    (2018.01)

(52) U.S. Cl.
CPC ..... *H04N 5/23241* (2013.01); *H04N 5/23216* (2013.01); *H04N 5/23245* (2013.01); *H04N 5/23258* (2013.01); *H04W 4/23* (2018.02)

(58) Field of Classification Search
CPC ........... H04N 5/23241; H04N 5/23245; H04N 5/23258; H04N 5/23216; H04W 4/23
See application file for complete search history.

(56) References Cited

U.S. PATENT DOCUMENTS

| | | | |
|---|---|---|---|
| 2010/0253792 A1* | 10/2010 | Kawaguchi ............ | H04N 5/232 348/208.2 |
| 2012/0196534 A1* | 8/2012 | Kasslin ................. | H04W 76/40 455/41.2 |
| 2013/0231065 A1* | 9/2013 | Hayashi .............. | H04M 1/7253 455/73 |

* cited by examiner

*Primary Examiner* — Shahbaz Nazrul
(74) *Attorney, Agent, or Firm* — Gazdzinski & Associates, PC (57) ABSTRACT

Apparatus and methods for the implementation of an orientation-based user interface. In one embodiment, a method for implementing an orientation-based user interface is disclosed. The method includes determining an orientation of an image capture device via use of an orientation sensor; associating the determining of the orientation with functionality for the image capture device; and enabling the functionality for the image capture device associated with the determining of the orientation. Image capture devices, computing systems, computer-readable apparatus and systems for the purposes of implementing orientation-based user interfaces are also disclosed.

20 Claims, 4 Drawing Sheets

METHODS AND APPARATUS FOR IMPLEMENTATION OF AN ORIENTATION-BASED USER INTERFACE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to orientation-based user interfaces, and more particularly in one exemplary aspect to advertisement of a wireless network interface for connection based upon orientation of the device.

Description of Related Art

Commodity camera technologies typically utilize image capture from a single vantage point. A class of these camera technologies is what is now referred to as a so-called "action camera". These action cameras are typically digital cameras that are designed for, inter alia, capturing scenes where a viewer gets the sense of being immersed in this content during playback. These action cameras are often employed on helmets, surfboards, or other suitable types of mounting surfaces in order to capture the experience of the individual to which the camera may be mounted. More recently, smaller action camera devices such as the HERO® Session family of camera devices manufactured by the Assignee hereof, has resulted in smaller form factor action cameras. While these smaller form factor devices are generally more convenient for the wearer, as opposed to larger/bulkier form factor action cameras, these smaller form factor action cameras have introduced a number of disadvantages. For example, due to the smaller form factor designs associated with these devices, the real estate available for interactive touch screen user interfaces has been diminished to the point where there implementation may no longer be viable. Additionally, these smaller form factor designs result in accompanying smaller form factor batteries for these devices, thereby limiting their useful life on a single battery charge.

To these ends, solutions are needed to overcome these aforementioned disabilities for, inter alia, small form factor image capture devices. Ideally, such solutions would enable users to utilize the full functionality of these devices by, for example, enabling the selection of various image capture mode functionalities and settings, or enabling the transfer of captured content to another device such as a smartphone. Ideally, such solutions would also conserve battery power when these functions or functionalities are no longer needed. Additionally, such solutions should be intuitive to use, thereby encouraging their adoption by end consumers.

SUMMARY

The present disclosure satisfies the foregoing needs by providing, inter alia, methods and apparatus for implementation of an orientation-based user interface.

In one aspect, an image capture device is disclosed. In one embodiment, the image capture device includes an orientation-based user interface, the image capture device further including: an imaging sensor; an orientation sensor; a wireless network interface; a processing apparatus; and a non-transitory computer readable apparatus that includes a medium adapted to store a computer program, the computer program which, when executed, implements the orientation-based user interface by: a determination of orientation of the image capture device via use of the orientation sensor; associate the determination of orientation with functionality for the image capture device; and enable the functionality for the image capture device associated with the determination.

In one variant, the enabled functionality includes a power on function for the image capture device.

In another variant, the enabled functionality includes a power off function for the image capture device.

In yet another variant, the enabled functionality includes turning on a wireless function for the wireless network interface.

In yet another variant, the wireless function includes an advertisement function, the advertisement function enabling another computing device to connect with the image capture device.

In yet another variant, the advertisement function includes a transmission of wireless packets.

In yet another variant, the non-transitory computer readable apparatus including the medium adapted to store the computer program, the computer program which, when executed, implements the orientation-based user interface by: a disablement of the orientation sensor subsequent to the enablement of the functionality.

In yet another variant, the determination of orientation of the image capture device via use of the orientation sensor includes determination of a compound orientation.

In another aspect, a method for implementing an orientation-based user interface is disclosed. In one embodiment, the method includes: determining an orientation of an image capture device via use of an orientation sensor; associating the determining of the orientation with functionality for the image capture device; and enabling the functionality for the image capture device associated with the determining of the orientation.

In one variant, the enabling of the functionality includes enabling a wireless network interface device of the image capture device.

In another variant, the method further includes disabling operation of the orientation sensor subsequent to the enabling of the wireless network interface device.

In yet another variant, the enabling of the wireless network interface device includes causing the wireless network interface device to begin transmitting an advertisement message.

In yet another variant, the method further includes powering on the image capture device prior to the determining of the orientation.

In yet another variant, the powering on of the image capture device includes powering on the image capture device into a low power state, the low power state consuming less power than a full power state for the image capture device.

In yet another variant, the determining of the orientation of the image capture device via use of the orientation sensor includes determining a compound orientation for the image capture device.

In yet another aspect, a non-transitory computer readable apparatus is disclosed. In one embodiment, the non-transitory computer readable apparatus includes a medium adapted to store a computer program, the computer program which, when executed by a processing apparatus, implements an orientation-based user interface by: a determination of orientation of an image capture device via use of an orientation sensor; associate the determination of orientation with functionality for the image capture device; and enable the functionality for the image capture device associated with the determination.

In one variant, the enabled functionality includes a power on function for the image capture device.

In another variant, the enabled functionality includes a power off function for the image capture device.

In yet another variant, the enabled functionality includes turning on a wireless function for a wireless network interface of the image capture device.

In yet another variant, the wireless function includes an advertisement function, the advertisement function enabling another computing device to connect with the image capture device.

In yet another variant, the advertisement function includes a transmission of wireless packets.

In yet another variant, the computer program which, when executed, implements the orientation-based user interface by: a disablement of the orientation sensor subsequent to the enablement of the functionality.

In yet another variant, the determination of orientation of the image capture device via use of the orientation sensor includes determination of a compound orientation.

In yet another aspect, systems for implementing the orientation-based user interface is disclosed. In one embodiment, the system includes an image capture device that includes an orientation-based user interface, the image capture device further including: an imaging sensor; an orientation sensor; a wireless network interface; a processing apparatus; and a non-transitory computer readable apparatus that includes a medium adapted to store a computer program, the computer program which, when executed, implements the orientation-based user interface by: a determination of orientation of the image capture device via use of the orientation sensor; associate the determination of orientation with functionality for the image capture device; and enable the functionality for the image capture device associated with the determination. The system also includes a computing system, the computing system configured to interact with the enabled functionality.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

All Figures disclosed herein are © Copyright 2017-2018 GoPro Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while primarily discussed in the context of apparatus and methodologies for use with small form-factor image capture devices, it would be readily apparent to one of ordinary skill given the contents of the present disclosure that such small form-factor devices are not necessary for the practice of the principles of the present disclosure. In fact, the principles of the present disclosure may find utility in other larger form-factor image capture devices. Additionally, the principles of the present disclosure may find utility in other types of devices whose primary function may not involve image capture. As but one non-limiting example, the principles of the present disclosure may find utility in other types of computing devices such as, for example, smart phones, laptop computers, personal media players and the like.

These and other variants would be readily apparent to one of ordinary skill given the contents of the present disclosure.
Small Form Factor Image Capture Device—

Figure 1:
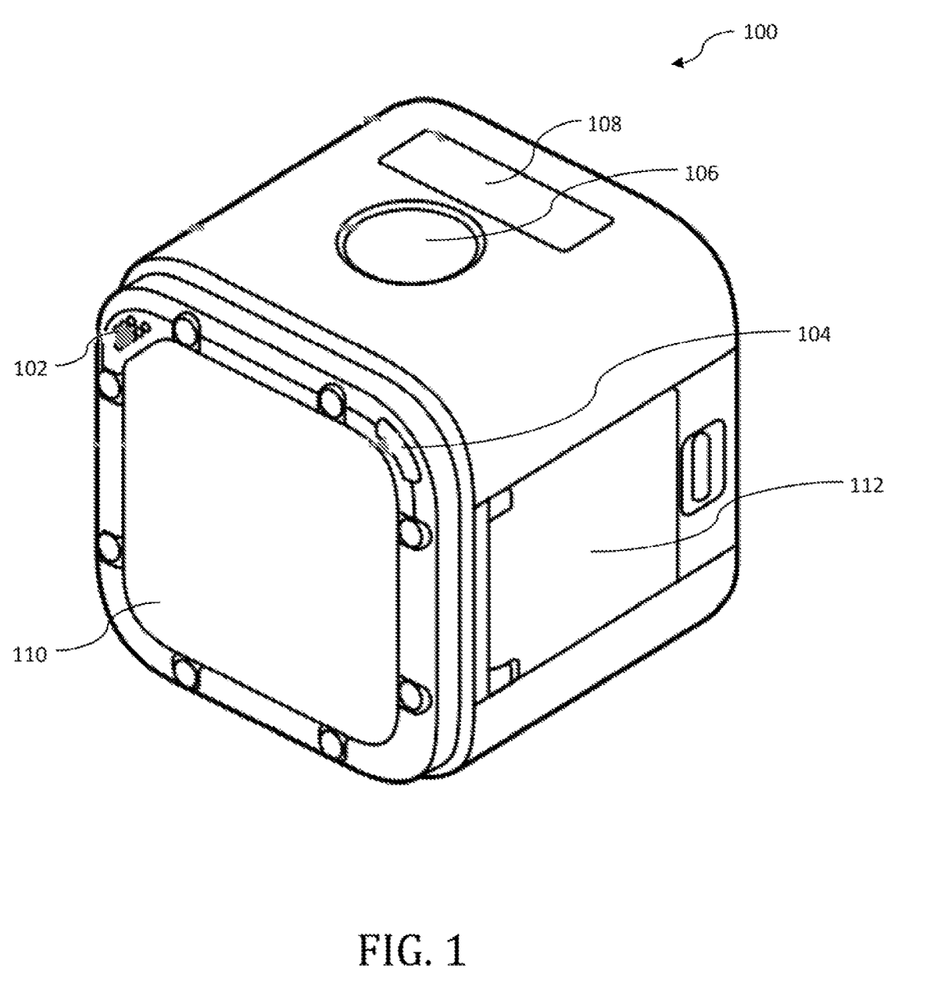
FIG. 1 is a perspective view illustrating an exemplary small form factor image capture device in accordance with one implementation.

Referring now to FIG. 1, an exemplary small form-factor image capture device 100 is shown and described in detail. As used in the present context, the term "small form-factor" refers to apparatus that are of a size where the implementation of user interfaces such as, for example, touch screen interfaces are not readily achievable or otherwise inconvenient or undesirable for such devices. Examples of exemplary small-form factor image capture devices include, for example, the HERO® Session family of camera devices manufactured by the Assignee hereof. Small form-factor image capture devices may have utility in the context of action cameras as it may be desirable to have a smaller less bulky image capture device when capturing certain types of content.

The image capture device 100 may include a built-in microphone 102 (e.g., a signal capture device). This microphone 102 may be utilized for not only capturing sound to accompany the captured images, but may also be used to receive a pre-set listing of verbal commands. This pre-set listing of verbal commands may include so-called action commands, which enable different types of image capture (e.g. video capture, photo capture, burst mode capture, time-lapse capture and other types of capture). Action commands may further include commands that start/stop image capture, or commands that "hi-light" moments during image capture that may be used to facilitate subsequent editing of the captured footage.

This pre-set listing of verbal commands may also include, for example, so-called mode commands that enable the selective alteration of various settings for the image capture device 100. These various modes may include various image resolution settings (e.g., 4K, 2.7K, 1440p, 1080p, 960p, 720p, and other types of imaging resolutions) and/or various aspect ratio settings for image capture (e.g., 16:9 aspect ratios, 4:3 aspect ratios and other types of aspect ratios). These modes may further include in addition to, or alternatively from, the aforementioned settings, options for available frames per second (FPS) modes, which enable the capture of a given number of video frames in each second of captured footage. These modes may further include various field of view (FOV) mode settings (e.g., so-called wide FOV, medium FOV, and narrow FOV settings). These and other mode types would be readily apparent to one of ordinary skill given the contents of the present disclosure.

The image capture device 100 may also include a camera status light 104 (e.g., a signal generation device). The camera status light 104 may be utilized during charging operations for the image capture device 100. For example, the camera status light 104 may turn on during charging operations and may turn off when charging is complete (i.e., when an internal battery is fully charged). The camera status light 104 may further be utilized to indicate active image capture. For example, when capturing video, the camera status light 104 may blink. When not capturing video, the camera status light 104 may be turned off. As but another example, when capturing static images, the camera status light 104 may blink, while remaining off when not capturing static images. Moreover, while a single camera status light 104 is illustrated in FIG. 1, it would be appreciated that in some implementations that two or more status lights be included. For example, it may be desirable to include one or more camera status lights 104 on each face of the image capture device 100 (e.g., on each of the six faces of the image capture device illustrated in FIG. 1). These and other variants would be readily apparent to one of ordinary skill given the contents of the present disclosure.

The image capture device 100 may also include a shutter button 106 as well as a camera status screen 108. The shutter button 106 may enable the capturing of video/images. The shutter button 106 may also enable the selection of various ones of the aforementioned modes. For example, various modes may be displayed in the camera status screen 108. Navigation of the modes may be enabled via the use of a separate button or buttons (not shown). Once a desired mode is displayed in the camera status screen 108, the pressing of the shutter button 106 may enable selection of the displayed mode. For example, a user may navigate through the camera status screen 108 in order to select the capture of 4K video via the pressing of shutter button 106. The user may then press shutter button 106 an additional time in order to begin capturing 4K video content via the optical element 110 of the image capture device 100. In some variants, the shutter button 106 (as well as one or more other buttons) may be obviated in their entirety. In these variants, the image capture device may be controlled entirely with the orientation-based user interface described subsequently herein. These and other variants would be readily apparent to one of ordinary skill given the contents of the present disclosure.

Image capture device 100 may further include one or more door(s) 112. This door 112 may be utilized to selectively cover/uncover various internal components of the image capture device 100. For example, underneath door 112, the image capture device 100 may further include one or more slots to receive memory (e.g., a microSD card slot), and may further include a charging port (e.g., a USB-C port) for the charging of an internal battery for image capture device 100. This charging port is particularly useful when the internal battery is not removable from the device. The internal battery may be removable in some variants, thereby enabling the removal of the charging port from the image capture device 100. Removal of an existing internal battery, and subsequent insertion of an additional charged battery may also aid in ensuring a ready power source is available for the image capture device 100 (i.e., without waiting for the battery to charge).

The capture device 100 may further include one or more internal metadata sources; for example, video, inertial measurement unit or accelerometer(s) (e.g., orientation sensors), global positioning system (GPS) receiver component and/or other metadata sources. In some implementations, the capture device 100 may include a device described in U.S. patent application Ser. No. 14/920,427 entitled "APPARATUS AND METHODS FOR EMBEDDING METADATA INTO VIDEO STREAM" filed on Oct. 22, 2015, which is incorporated herein by reference in its entirety. The capture device 100 may include one or more optical elements 110. Individual optical elements 110 may include, by way of non-limiting examples, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, polarized lens, other lens, and/or other optical elements. Capture devices with two or more individual optical elements 110 may enable the capture of panoramic (e.g., 360° FOV) content.

The capture device 100 may be interfaced to an external metadata source (e.g., a GPS receiver, a cycling computer, a metadata puck, and/or other device configured to provide information related to one or more portions of capture device 100 and/or its environment) via a communication link. The capture device 100 may interface to an external user interface device (e.g., a smartphone, a tablet computer, a phablet, a smart watch, a portable computer, and/or other device configured to receive user input and communicate information (e.g., image capture control commands) with the camera capture device 100 via the link). In one or more implementations, individual links may utilize any practical wireless interface configuration including, for example, Wi-Fi, Bluetooth (BT), cellular data link, ZigBee, Near Field Communications (NFC) link, for example, using ISO/IEC 14443 protocol, IEEE Std. 802.15, 6LowPAN, Z-Wave, ANT+link, and/or other wireless communications link. In some implementations, individual links may be effectuated using a wired interface, for example, HDMI, USB, digital video interface, DisplayPort interface (e.g., digital display interface developed by the Video Electronics Standards Association (VESA), Ethernet, Thunderbolt), and/or other types of interface. In some implementations, these individual links may include both a wired link such as, for example, HDMI, USB, coaxial audio, and/or other interface and a wireless link such as, for example, Wi-Fi or Bluetooth (BT). These individual links may be utilized for the transfer of content (e.g., imaging content) from the capture device 100 to other computing devices such as smart phones, laptop computers, desktop computers and other types of computing devices. The various apparatus, methodologies and functionalities of image capture device 100 will be described in subsequent detail herein with respect to FIGS. 2-4.

Orientation-Based User Interface Methodologies—

Figure 2:
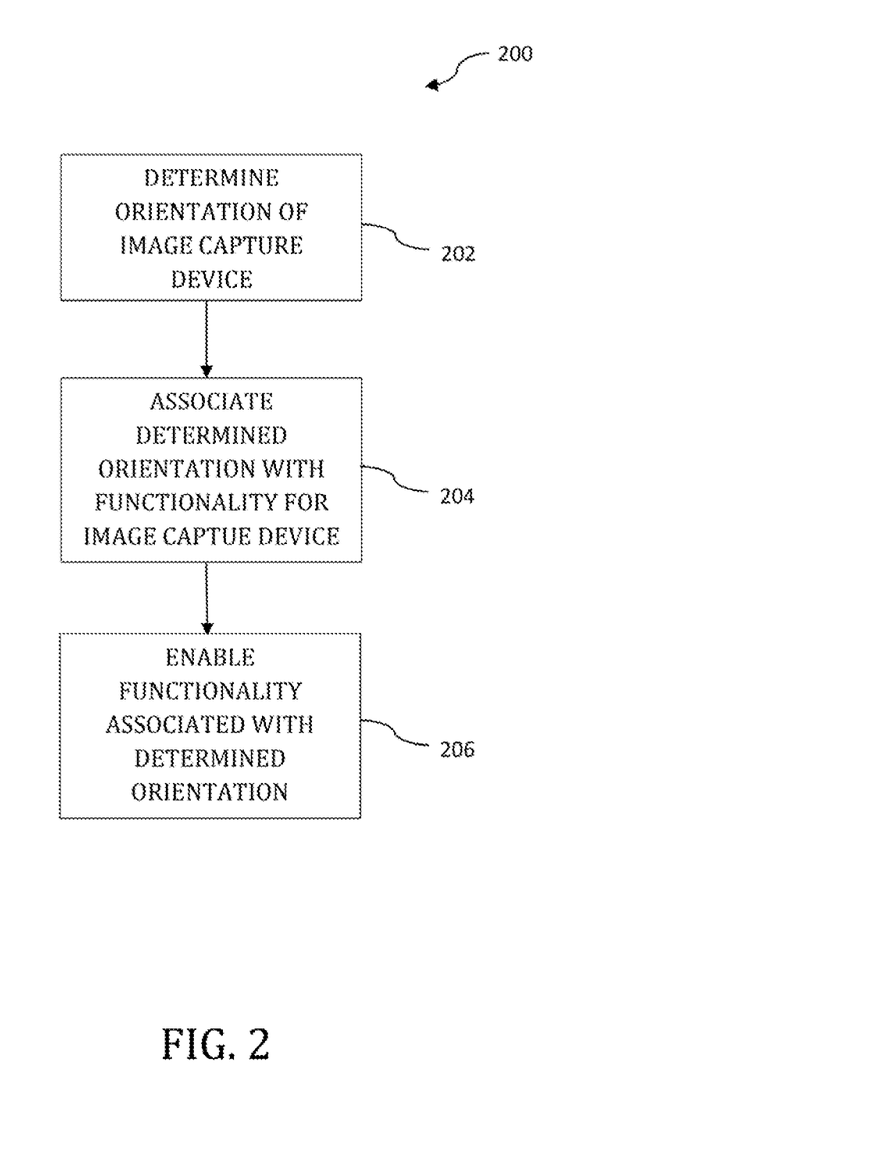
FIG. 2 is a logical flow diagram illustrating one exemplary implementation of a method for enabling functionality associated with a determined orientation of an image capture device, such as the small form factor image capture device of FIG. 1, in accordance with the principles of the present disclosure.

The following methodologies provide for methods of enabling functionality of, for example, an image capture device (such as e.g. image capture device 100 illustrated in FIG. 1) via use of pre-defined orientations for the image capture device. Referring now to FIG. 2, an exemplary methodology 200 for enabling functionality associated with a determined orientation is shown and described in detail. At operation 202, the orientation of the image capture device is determined. For example, the orientation of the image capture device may be determined through the use of one or more orientation sensors (410, FIG. 4) such as an accelerometer or gyroscope as but some non-limiting examples. In some implementations, orientation may be determined using a light sensor. For example, light sensor may be implemented on the same face as the optical element 110 depicted in FIG. 1. Accordingly, when the image capture device is placed face down (i.e., where the face having the optical element 110 is placed against a surface such as a table), the light sensor may detect an absence of light thereby indicating to image capture device a defined orientation (or a defined condition (e.g., light or dark lighting conditions)).

Referring back to FIG. 1, orientation sensor(s) located within the image capture device 100 can determine how the image capture device 100 is oriented. For example, the orientation sensor(s) may determine that the face containing optical element 110 is positioned in a downward position (e.g., optical element 110 is positioned against the surface of a table). In other implementations, the orientation sensor(s) may determine that the door 112 of the image capture device is positioned in a downward position, In yet other implementations, other orientations may be determined (e.g., shutter button 106 is positioned in a downward position). In addition to downward position, orientation sensors may determine that a particular component is positioned in any number of other orientations (e.g., upwards, sideways, front, back, etc.).

In addition to single determinations, in some implementations it may be desirable to determine compound (two or more) orientations that are spaced apart by a given timeframe. For example, and referring back to FIG. 1, it may be desirable to first determine a first given orientation at a first instance of time (e.g., the optical element 110 is positioned in a downwards position at to) followed by a subsequent given orientation at a second instance of time (e.g., the optical element 110 is positioned in an upwards position at $t_1$). Through the addition of compound determinations, additional functionalities may be associated with these pre-defined orientations. Compound orientations using three (or more) determined orientations may be utilized in some implementations as well. For example, optical element 110 may be determined to be in a first given orientation at a first instance of time, a second given orientation at a second instance of time, and a third given orientation at a third instance of time. In some implementations, the third given orientation may be the same as the first given orientation.

In some implementations, human-perceptible signal generation devices (418, FIG. 4) may be included to aid and provide feedback to a user when placing image capture device 100 in a pre-defined orientation. Such human-perceptible signal generation devices may include audible generation devices (e.g., speakers) and/or light generation devices (e.g., light emitting diodes (LEDs)). For example, in single determination schemes an image capture device may generate an audible sound and/or may emit a distinctive color and/or distinctive blinking pattern when a user orients the image capture in a particular way. As but another example using compound orientations, an image capture device may utilize the signal generation device so as to provide feedback to a user during a first action in a compound action. Such signal generation may signal to a user that the first action of a compound action was determined and indicate to the user that the user may proceed with other subsequent orientations. Signal generation may continue to be projected after each one of the subsequent orientations of a compound command.

Additionally, while these examples have primarily been provided in the context of orientation determination for a six-sided cube (e.g., the image capture device 100 illustrated in FIG. 1), it would be readily appreciated that the number of sides of, for example, a given image capture device may be varied in alternative variants. For example, image capture device may include a pentahedron-like shape having five (5) distinct faces. Other examples include, without limitation, tetrahedrons (4 faces), heptahedrons (7 faces), dodecahedrons (12 faces) and other types of polyhedron type shapes. Via the addition or removal of various faces of an image capture device, additional (or fewer) associations may be provided. For example, for a six-sided device, the device may be able to determine six (6) distinct orientations; however, with a twelve-sided device, the device may be able to determine twelve (12) distinct orientations. These and other variants would be readily apparent to one of ordinary skill given the contents of the present disclosure.

In some implementations, orientation sensors may be utilized in conjunction with other components of image capture device 100 in order associate a determined orientation with functionality for the image capture device. For example, orientation sensors may be utilized in conjunction with a global positioning system (GPS) receiver. Accordingly, a determined orientation and the functionality that may be enabled may be dependent upon the image capture device's location (e.g., indoors vs. outdoors). For example, a determined orientation may be associated with image capture device functionality when the image capture device is determined to be outside, while the same determined orientation may not be associated with image capture device functionality when the image capture device is determined to be inside. As but another non-limiting example, the GPS receiver may determine that the user of the image capture device 100 is located at a ski resort. Accordingly, certain functionalities may be enabled while the user is located on a ski slope, while certain functionalities may be disabled while the user is located on a chair lift, and vice versa. For example, image capture may be enabled/disabled dependent upon the location of the user. These and other variants would be readily apparent to one of ordinary skill given the contents of the present disclosure.

As but another non-limiting example, a determined orientation may be associated with image capture device functionality when the image capture device is in a certain time period (e.g., during daylight hours between 7 am and 7 pm), while the same determined orientation may not be associated with image capture device functionality when the image capture device is determined to be outside the certain time period (e.g., during nighttime hours between 8 pm and 6 am). These and other variants would be readily apparent to one of ordinary skill given the contents of the present disclosure.

At operation 204, the image capture device may associate the determined orientation with functionality for the image capture device. As but one non-limiting example, a given orientation may be associated with control of a network interface device (420, FIG. 4). For example, where the network interface device includes a Bluetooth interface, a given orientation may cause the image capture device to begin transmission of advertisement packets. These advertisement packets may be utilized for connection to the image capture device by other external computing devices or computing systems such as e.g., a smart phone. Accordingly, by limiting advertisement to a specific orientation of the image capture device, power consumption may be conserved and utilization of battery power may be restricted to time instances in which a user wishes to activate this network interface device functionality. In some implementations, the functionality may include powering on (or powering off) the image capture device. For example, the image capture device may associate the determined orientation with a power off command thereby conserving power for the device. Alternatively, the image capture device may associate the determined orientation with a power on command thereby enabling at least some of the functionality of the image capture device.

In some implementations, other functionality for the image capture device may be associated with the determined orientation at operation 202. For example, various ones of the aforementioned action commands and/or mode commands may be enabled via a determined orientation. In other words, the detection of various action commands and/or mode commands may require a given determined orientation. In some implementations, the action commands and/or mode commands may be associated directly with a determined orientation. By way of non-limiting example, a determined orientation may be associated with video capture, photo capture, burst mode capture and/or time lapse capture. For example, orienting the image capture device on a first face may enable video capture, orienting the image capture device on a second face may enable photo capture, orienting the image capture device on a third face my enable burst mode capture, and orienting the image capture device on a fourth face may enable time lapse capture.

In some implementations, it may be desirable to include visual cues on the image capture device itself. For example, an icon that is indicative of video capture may be placed on one face, an icon that is indicative of photo capture may be placed on a second face, an icon that is indicative of burst mode capture may be placed on a third face, and an icon that is indicative of time lapse capture may be placed on a fourth face. In addition to these specific examples, other icons that are associated with powering on/off, action commands, mode commands and other types of functionality for the image capture device may include respective icons on the image capture device itself. These icons may be embossed within the underlying material of the image capture device housing, or may be included on the housing using a separate material (e.g., paint, stickers, and/or other suitable types of indications). In some implementations, one or more of the aforementioned action commands (or mode commands) may be associated with compound orientations.

A determined orientation may be associated with various ones of the aforementioned settings (e.g., resolution settings, aspect ratio settings, FPS settings, FOV mode settings). In some implementations, these aforementioned settings may be associated with compound orientations. For example, orienting the image capture device on a first face may enable access to various resolution settings. Subsequent to determining the orientation of the image capture device to be on the first face, orienting the image capture device on a second, third, fourth, fifth face, etc. may allow for the selection of various ones of these resolution settings. For example, orienting the image capture device on a second face may enable 4K resolution capture, orienting the image capture device on a third face may enable 2.7K resolution capture, orienting the image capture device on a fourth face may enable 1080p resolution capture, and orienting the image capture device on a fifth face may enable 720p resolution capture. As but another non-limiting example, the faces may be numbered one (1) through six (6). A manual or other product literature may indicate that capturing 4K resolution video may be accomplished by first orienting the image capture device on face two (2), followed by face four (4). Accordingly, placing image capture devices in this compound orientation may result in image capture device being configured to capture 4K resolution video. These and other variants would be readily apparent to one of ordinary skill given the present disclosure.

In some implementations, a given orientation may be associated with two or more functionalities. In such a scenario, the image capture device may be able to distinguish between these two or more functionalities using an additional input from a user. For example, orienting the image capture device on a first face for a first time period may enable wireless interface connectivity, while orienting the image capture device on the first face for a second time period may enable an action command (e.g., video capture). As but another non-limiting example, orienting the image capture device on a first face subsequent to the press of a button may enable wireless interface connectivity, while orienting the image capture device on a first face without pressing the button may enable an action command. In some implementations, the pressing of the button may be obviated in favor of proximity sensors (e.g., that detect proximity to a user), a thermal sensor and other types of sensors. Additional complexity may be added via the use of compound orientation determination, timing constraints, proximity constraints, thermal constraints and/or button presses either before or subsequent to orienting the image capture device. These and other orientation schemes would be readily apparent to one of ordinary skill given the present disclosure.

In addition to the power consumption advantages for the orientation-based schemes described herein, the present disclosure also has additional benefits and utility beyond power conservation. For example, where image capture devices having relatively large user interfaces (e.g., touch screens, keyboards, buttons and/or other types of user interfaces) are impractical or undesirable, the present disclosure provides for an orientation-based user interface that is otherwise not dependent on device size. Accordingly, the present disclosure may have benefits for small-form factor devices, or other types of devices where it may be desirable to remove non-orientation-based user interfaces as a design constraint.

Example Operation—

Figure 3:
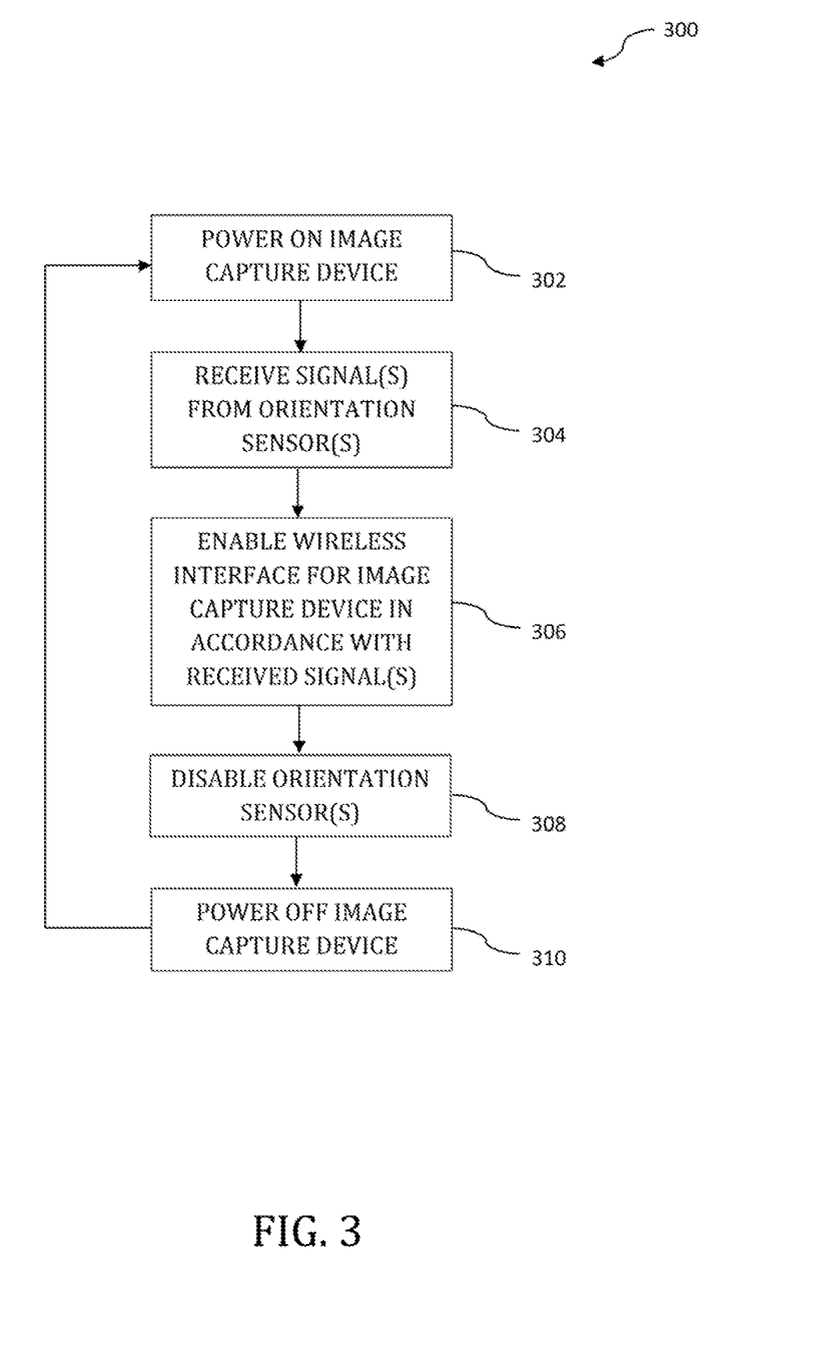
FIG. 3 is a logical flow diagram illustrating another exemplary implementation of a method for enabling functionality while conserving, inter alia, battery life, in accordance with the principles of the present disclosure.
Figure 4:
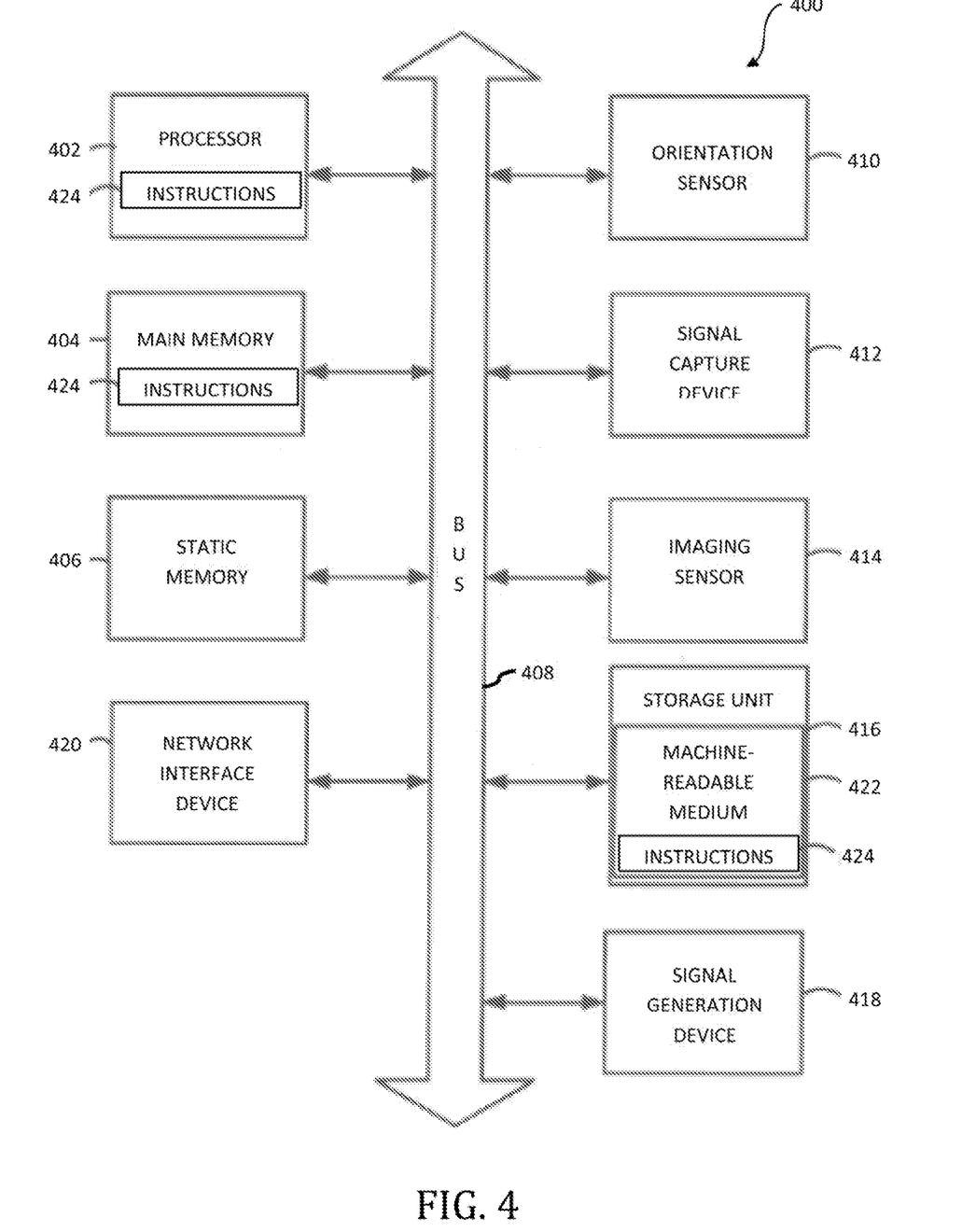
FIG. 4 is a block diagram of an exemplary implementation of an image capture device, useful in performing, for example, the methodologies of FIGS. 2-3, in accordance with the principles of the present disclosure.

Referring now to FIG. 3, an exemplary methodology 300 for enabling functionality while conserving, inter alia, battery life is shown and described in detail. At operation 302, an image capture device is powered on. For example, and in the exemplary context of the image capture device 100 illustrated in FIG. 1, the image capture device 100 may be powered on by pressing shutter button 106. In some implementations, a minimum number of internal components within image capture device may be initially supplied with power upon a power on event. For example, the orientation sensor(s) 410 may be powered, while other ones of the internal components may either reside in an off state or a lower power state. Such an implementation may be desirable as the image capture device may conserve battery resources (power) until, for example, a user intends to use image capture device, or other functionalities of image capture device.

At operation 304, signals are received from orientation sensor(s). In some implementations, a desired orientation is detected by orientation sensor(s) and signals are transmitted/received that are indicative of this desired orientation. For example, and in the context of the image capture device 100 of FIG. 1, the desired orientation may be when the face containing the optical element 110 is placed on a surface such as a table, floor, countertop, furniture, etc. Other orientations, such as those described supra with respect to FIG. 2, may be utilized as desired orientations.

At operation 306, the wireless interface for the image capture device is enabled in accordance with the received signals from the orientation sensor(s). For example, the wireless interface may begin transmission of packets (e.g., beacons) advertising its availability for connection. Wireless interface may include a Bluetooth wireless interface in some implementations. In some implementations, wireless interface may include a Wi-Fi wireless interface. These and other variants would be readily apparent given the contents of the present disclosure.

At operation 308, the orientation sensor(s) may be disabled. For example, in some implementations it may be desirable to disable the orientation sensor(s) once a device has connected with image capture device. In some variants, the orientation sensor(s) may be disabled after a set period of time (whether after connection or before an external device is connected). This set period of time may include seconds, minutes, or even hours. Such disabling of orientation sensor(s) may be useful for power conservation, and/or may even be useful to prevent undesired alteration of additional functionalities for image capture device. For example, once a wireless interface is enabled (at operation 306), it may be undesirable to subsequently turn off the wireless interface, power down the device or otherwise have the image capture device behave in an undesired manner.

At operation 310, the image capture device may be powered off. For example, image capture device may be powered off after a given amount of time has elapsed (e.g., 8 hours), may be powered off at a predetermined time (e.g., 11 pm), or may be powered off after the useful battery life gets down to a given percent (e.g., 5% of battery life remaining). In some implementations, the image capture device may be completely powered off, or may even be placed into a "deep sleep" or other lower power state. In some implementations, these lower power states may facilitate the powering on of image capture device at operation 302. These and other variants would be readily apparent to one of ordinary skill given the contents of the present disclosure.

Exemplary Apparatus—

FIG. 4 is a block diagram illustrating components of an exemplary image capture device (such as the image capture device 100 illustrated in FIG. 1). The image capture device may be able to read instructions from a computer-readable medium and execute them in one or more processors (or controllers). The image capture device illustrated in FIG. 4 may implement at least a portion of the methodologies described with respect to FIGS. 2-3 described supra.

The image capture device 400 may be used to execute instructions 424 (e.g., program code or software) for causing the image capture device 400 to perform any one or more of the orientation-based user interface methodologies (or processes) described herein. In some implementations, the image capture device 400 may operate as a standalone device or may operate as a connected (e.g., networked) device that connects to other computer systems. The image capture device 400 may include, for example, an action camera (e.g., a camera capable of capturing, for example, a 360° FOV) capable of executing instructions 424 (sequential or otherwise) that specify actions to be taken. In a networked deployment, the image capture device 400 may operate in the capacity of a server or client in a server-client network environment, or as a peer device in a peer-to-peer (or distributed) network environment. Further, while only a single image capture device 400 is illustrated, a plurality of image capture devices 400 may operate to jointly execute instructions 424 to perform any one or more of the orientation-based user interface methodologies discussed herein, or portions of the orientation-based user interface methodologies described herein.

The example image capture device 400 includes one or more processing units (generally processor apparatus 402). The processor apparatus 402 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The image capture device 400 may include a main memory 404. The image capture device 400 may also include a storage unit 416. The processor 402, memory 404 and the storage unit 416 may communicate via a bus 408. The image capture device 400 may also include a static memory 406.

The image capture device 400 may include one or more orientation sensors 410. These one or more orientation sensors may include an accelerometer that is configured to detect acceleration, tilt and vibration in order to determine movement and orientation. The one or more orientation sensors may include a gyroscope in addition to, or alternatively from, the aforementioned accelerometers. The gyroscope may identify one or more of up/down, left/right, and rotation around three axes in order to determine more complex orientation details. These one or more orientation sensors 110 may be utilized in a so-called micro-electromechanical system (MEMS) device. This MEMS device may be included as an integrated circuit and may communicate with other elements of the image capture device 400 via, for example, the bus 408.

The image capture device 400 may include one or more imaging sensors 414 for capturing images for the image capture device 400. The image capture device 400 may also include a signal capture device 412. In some implementations, the signal capture device 412 may include a microphone for capturing sounds. These captured sounds may be stored in one or more of main memory 404, static memory 406, or storage unit 416. The signal capture device 412 may further include one or more buttons such as shutter button 106, FIG. 1. The image capture device 400 may also include one or more signal generation devices 418. In some implementations, the signal generation device 418 may include an LED. For example, signal generation device 418 may constitute the camera status light 104 as illustrated in FIG. 1. The signal generation device 418 may also include a display such as the camera status screen 108 illustrated in FIG. 1. The signal generation device 418 may include a speaker in some implementations, in order to provide e.g., audio feedback to a user of image capture device 400.

The storage unit 416 includes a computer-readable medium 422 on which is stored instructions 424 (e.g., a computer program or software) that when executed by e.g., processor 402, embodies any one or more of the methodologies or functions described herein. The instructions 424 may also reside, completely or at least partially, within the main memory 404 or within the processor 402 (e.g., within a processor's cache memory) during execution thereof by the image capture device 400, the main memory 404 and the processor 402 also constituting computer-readable media. The instructions 424 may be transmitted or received over a network via the network interface device 420.

While computer-readable medium 422 is shown in an example embodiment to be a single medium, the term "computer-readable medium" should be taken to include a single medium or multiple media (e.g., a centralized or distributed database, or associated caches and servers) able to store the instructions 424. The term "computer-readable medium" shall also be taken to include any medium that is capable of storing instructions 424 for execution by the image capture device 400 and that cause the image capture device 400 to perform, for example, one or more portions of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, for example, different memories in a system.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

As used herein, the terms "computing device" or "computing system" includes, but is not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps that perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces. As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. An image capture device that includes an orientation-based user interface, the image capture device comprising:
   an imaging sensor;
   an orientation sensor configured to detect at least a first orientation;
   a wireless network interface initially in a disabled state;
   a processing apparatus; and
   a non-transitory computer readable apparatus comprising a medium adapted to store a computer program, the computer program which, when executed, implements the orientation-based user interface by:
      determination of orientation of the image capture device via use of the orientation sensor;
      association of the determination of orientation with functionality for the image capture device; and
      responsive to a change in the determined orientation with respect to the first orientation of the image capture device, enablement of the functionality for the image capture device associated with the determination, the enablement of the functionality comprising enablement of a wireless function for the wireless network interface from the disabled state.

2. The image capture device of claim 1, wherein the enablement of the functionality further comprises a power on function for the image capture device.

3. The image capture device of claim 1, wherein the enablement of the functionality further comprises a power off function for the image capture device.

4. The image capture device of claim 1, wherein the wireless function comprises an advertisement function, the advertisement function enabling another computing device to connect with the image capture device.

5. The image capture device of claim 4, wherein the advertisement function comprises a transmission of wireless packets.

6. The image capture device of claim 5, wherein the non-transitory computer readable apparatus comprising the medium adapted to store the computer program, the computer program which, when executed, implements the orientation-based user interface by:
   a disablement of the orientation sensor subsequent to the enablement of the functionality.

7. A method for implementing an orientation-based user interface, the method comprising:
   determining an orientation of an image capture device via use of an orientation sensor configured to detect at least one prescribed orientation;
   associating the determining of the orientation with functionality for the image capture device; and
   in response to the determined orientation matching a different orientation with respect to the at least one prescribed orientation of the image capture device, enabling the functionality for the image capture device associated with the determining of the orientation, the enabling of the functionality comprising enabling of a wireless network interface of the image capture device from an initial disabled state.

8. The method of claim 7, further comprising disabling operation of the orientation sensor subsequent to the enabling of the wireless network interface device.

9. The method of claim 8, wherein the enabling of the wireless network interface device comprises causing the wireless network interface device to begin transmitting an advertisement message.

10. The method of claim 7, further comprising powering on the image capture device prior to the determining of the orientation.

11. The method of claim 10, wherein the powering on of the image capture device comprises powering on the image capture device into a low power state, the low power state consuming less power than a full power state for the image capture device.

12. A non-transitory computer readable apparatus comprising a medium adapted to store a computer program, the computer program which, when executed by a processing apparatus, implements an orientation-based user interface by:
   association of an orientation of an image capture device with at least one functionality for the image capture device, the determination of orientation made via use of an orientation sensor configured to detect at least a prescribed orientation;
   determination of orientation of the image capture device; and
   responsive to the determination of orientation indicating a change in orientation with respect to the prescribed orientation of the image capture device, enablement of the functionality for the image capture device associated with the determination, the enablement of the functionality comprising at least one of: (i) turning on a wireless function for a wireless network interface of the image capture device from an initial off state, or (ii) turning off a wireless function for a wireless network interface of the image capture device from an initial on state.

13. The non-transitory computer readable apparatus of claim 12, wherein the enablement of the functionality further comprises at least one of (i) a power on function for the image capture device, or (ii) a power off function for the image capture device.

14. The non-transitory computer readable apparatus of claim 12, wherein the enablement of the functionality further comprises a power off function for the image capture device.

15. The non-transitory computer readable apparatus of claim 12, wherein the wireless function comprises an advertisement function, the advertisement function enabling another computing device to connect with the image capture device.

16. The non-transitory computer readable apparatus of claim 15, wherein the advertisement function comprises a transmission of wireless packets.

17. The non-transitory computer readable apparatus of claim 16, wherein the computer program which, when executed, implements the orientation-based user interface by:
 a disablement of the orientation sensor subsequent to the enablement of the functionality.

18. The image capture device of claim 1, wherein the determination of the orientation of the image capture device via the use of the orientation sensor comprises use of a second component of the image capture device in conjunction with the orientation sensor, the second component being configured to determine a location of the image capture device; and
 wherein the enablement of the wireless function is based on the determination of the location of the image capture device.

19. The image capture device of claim 1, wherein the determination of the orientation of the image capture device comprises determination of the orientation of the image capture device via the imaging sensor, the imaging sensor being configured to determine at least an absence of light.

20. The method of claim 7, further comprising, in response to the enabling of the wireless network interface, disabling the orientation sensor.

* * * * *